US009113487B2

(12) United States Patent
Nammi

(10) Patent No.: US 9,113,487 B2
(45) Date of Patent: Aug. 18, 2015

(54) TIME MULTIPLEXED CHANNEL STATE INFORMATION REPORTING IN A MULTI ANTENNA WIRELESS COMMUNICATION SYSTEM

(71) Applicant: TELEFONAKTIEBOLAGET L M ERICSSON (publ), Stockholm (SE)

(72) Inventor: Sairamesh Nammi, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 269 days.

(21) Appl. No.: 13/810,842

(22) PCT Filed: Dec. 19, 2012

(86) PCT No.: PCT/EP2012/076144
§ 371 (c)(1),
(2) Date: Jan. 17, 2013

(87) PCT Pub. No.: WO2013/113450
PCT Pub. Date: Aug. 8, 2013

(65) Prior Publication Data
US 2014/0177545 A1 Jun. 26, 2014

Related U.S. Application Data

(60) Provisional application No. 61/592,061, filed on Jan. 30, 2012.

(51) Int. Cl.
*H04W 72/12* (2009.01)
*H04B 7/06* (2006.01)

(52) U.S. Cl.
CPC ............ *H04W 72/12* (2013.01); *H04B 7/0636* (2013.01); *H04W 72/1226* (2013.01); *H04B 7/063* (2013.01); *H04B 7/0632* (2013.01); *H04B 7/0639* (2013.01)

(58) Field of Classification Search
CPC ... H04W 72/12; H04L 5/0057; H04L 5/0053; H04L 5/0023; H04L 5/0048; H04L 5/0007
USPC .......................................... 370/329, 328, 252
See application file for complete search history.

(56) References Cited

U.S. PATENT DOCUMENTS

| 2012/0113825 A1* | 5/2012 | Baglin et al. ................... 370/252 |
| 2013/0155968 A1* | 6/2013 | Pelletier et al. ............... 370/329 |
| 2013/0195008 A1* | 8/2013 | Pelletier et al. ............... 370/328 |

OTHER PUBLICATIONS

Ericsson: "4-branch MIMO for HSDPA," 3GPP Draft; R1-111763 4-Branch MIMO for HSDPA, $3^{rd}$ Generation Partnership Project (3GPP), Mobile Competence Centre; RAN WG1, XP050491350, May 3, 2011.

(Continued)

*Primary Examiner* — Jamal Javaid
(74) *Attorney, Agent, or Firm* — Baker Botts, LLP

(57) ABSTRACT

The embodiments herein relates to a method in a user equipment (305) for enabling a base station (301) to schedule the user equipment (305) in a wireless communication system (300). The wireless communication system (300) is in Multiple Input Multiple Output, MIMO, mode and comprises four transmit antennas. The user equipment (305) is connected to the base station (301) via a radio carrier (302). The user equipment (305) determines Channel State Information, CSI, based on information about a Common Pilot Indicator CHannel, CPICH, which CSI comprises Channel Quality Information, CQI, a Rank Indicator, RI, a Precoding Channel Indicator, PCI, and an Hybrid Automatic Repeat reQuest ACKnowledgement/Not ACKnowledgement, HARQ ACK/NACK. The user equipment (305) transmits the CSI to the base station (301) over a plurality of Transmission Time Intervals, TTIs, enabling the base station (301) to schedule the user equipment (305).

37 Claims, 14 Drawing Sheets

(56) References Cited

OTHER PUBLICATIONS

Huawei, et al., "HS-DPCCH Design for 4-Branch MIMO," 3GPP Draft; R1-113848 HS-DPCCH Design for 4-Branch MIMO, $3^{rd}$ Generation Partnership Project (3GPP), Mobile Competence Centre; RAN WG1, XP050561940, Nov. 8, 2011.

Ericsson: "Feedback Channel Design for Four Branch MIMO System," 3GPP Draft; R1-120361 Feedback Channel Design, $3^{rd}$ Generation Partnership Project (3GPP), Mobile Competence Centre; XP050563309, Feb. 2, 2012.

QUALCOMM Europe: "Details on CQI Format," 3GPP Draft; R1-074971, $3^{rd}$ Generation Partnership Project (3GPP), Mobile Competence Centre; RAN WG1, XP050108424; Oct. 30, 2007.

Texas Instruments: "Design Aspects of UE Feedback," 3GPP Draft; R1-073423 TI MIMO UE Feedback, $3^{rd}$ Generation Partnership Project (3GPP), Mobile Competence Centre; RAN WG1, XP050107038, Aug. 15, 2007.

International Search Report and Written Opinion issued in Application Serial No. PCT/EP2012/076144 dated Feb. 22, 2013.

3GPP TSG RAN WG1 Meeting #68; Dresden, Germany; Title: Feedback Channel Design for Four branch MIMO System (R1-120361), Feb. 6-10, 2012.

3GPP TGS RAN WG1 Meeting #65; Barcelona, Spain; Title: 4-branch MIMO for HSDPA (R1-111763), May 9-13, 2011.

* cited by examiner

TIME MULTIPLEXED CHANNEL STATE INFORMATION REPORTING IN A MULTI ANTENNA WIRELESS COMMUNICATION SYSTEM

This application is the U.S. national phase of International Application No. PCT/EP2012/076144 filed 19 Dec. 2012 which designated the U.S. and claims priority to U.S. Provisional Appln. No. 61/592,061 filed 30 Jan. 2012, the entire contents of each of which are hereby incorporated by reference.

TECHNICAL FIELD

Embodiments herein relates generally to a user equipment, a method in the user equipment, a base station and a method in the base station. More particularly the embodiments herein relate to scheduling the user equipment in a wireless communication system.

BACKGROUND

In a typical cellular network, also referred to as a wireless communication system or simply a system, a User Equipment (UE), communicates via a Radio Access Network (RAN) to one or more Core Networks (CNs).

A user equipment is a mobile terminal by which a subscriber may access services offered by an operator's core network and services outside the operator's network to which the operator's RAN and CN provide access. The user equipment may be for example communication devices such as mobile telephones, cellular telephones, smart phones, tablet computers or laptops with wireless capability. The user equipment may be portable, pocket-storable, hand-held, computer-comprised, or vehicle-mounted mobile devices, enabled to communicate voice and/or data, via the radio access network, with another entity, such as another user equipment or a server.

The user equipment is enabled to communicate wirelessly in the system. The communication may be performed e.g. between two user equipments, between a user equipment and a regular telephone and/or between the user equipment and a server via the radio access network and possibly one or more core networks, comprised within the system.

The radio access network covers a geographical area which is divided into cell areas, with each cell area being served by a base station, e.g. a Radio Base Station (RBS). The base station is, in some radio access networks, also called evolved NodeB (eNB), NodeB, or B node. A cell is a geographical area where radio coverage is provided by the base station at a base station site. Each cell is identified by an identity within the local radio area, which is broadcast in the cell. The base stations communicate over the air interface operating on radio frequencies with the user equipment within range of the base station.

Standardised by the third Generation Partnership Project (3GPP), High Speed Packet Access (HSPA) supports the provision of voice services in combination with mobile broadband data services. HSPA comprises High Speed Downlink Packet Access (HSDPA), High Speed Uplink Packet Access (HSUPA) and HSPA+. HSDPA allows systems based on the Universal Mobile Telecommunications System (UMTS) to have higher data transfer speeds and capacity. In HSDPA, a new transport layer channel, High Speed Downlink Shared CHannel (HS-DSCH), has been added to the 3GPP UMTS Release 5 and further specifications. It is implemented by introducing three new physical layer channels: High Speed-Shared Control CHannel (HS-SCCH), Uplink High Speed-Dedicated Physical Control CHannel (HS-DPCCH) and High Speed-Physical Downlink Shared CHannel (HS-PDSCH). The HS-SCCH informs the user equipment that data will be sent on the HS-DSCH, two slots ahead. The HS-DPCCH carries acknowledgment information and a current Channel Quality Indicator (CQI) of the user equipment. This value is then used by the base station to calculate how much data to send to the user equipment in the next transmission. The HS-PDSCH is the channel mapped to the above HS-DSCH transport channel that carries actual user data. HSPA may recover fast from errors by using Hybrid Automatic Repeat reQuest (HARQ). HARQ is a technique that enables faster recovery from errors in systems by storing corrupted packets in the receiving device rather than discarding them. Even if retransmitted packets have errors, a good packet may be derived from the combination of bad ones. The term downlink used above may be abbreviated DL and is the link seen in the direction from the base station to the user equipment.

Multiple Input Multiple Output (MIMO) refers to any communications system with multiple antennas at the transmitter and receiver, and it is used to improve communication performance. The terms input and output refer to the radio channel carrying the signal, not to the devices having antennas. At the transmitter (Tx), multiple antennas may be used to mitigate the effects of fading via transmit diversity and to increase throughput via spatial division multiple access. At the receiver (Rx), multiple antennas may be used for receiver combining which provides diversity and combining gains. If multiple antennas are available at both the transmitter and receiver, then different data streams may be transmitted from each antenna with each data stream carrying different information but using the same frequency resources. For example, using two transmit antennas, one may transmit two separate data streams. At the receiver, multiple antennas are required to demodulate the data streams based on their spatial characteristics. In general, the minimum number of receiver antennas required is equal to the number of separate data streams. 4×4 MIMO, also referred to as four branch MIMO, or a system in MIMO mode, may support up to four data streams.

Several new features are added for the long term HSPA evolution in order to meet the requirements set by the International Mobile Telecommunications-Advanced (IMT-A). The main objective of these new features is to increase the average spectral efficiency. One possible technique for improving downlink spectral efficiency would be to introduce support for four branch MIMO, i.e. utilize up to four transmit and receive antennas to enhance the spatial multiplexing gains and to offer improved beam forming capabilities. Four branch MIMO provides up to 84 Mbps per 5 MHz carrier for high Signal to Noise Ratio (SNR) user equipment and improves the coverage for a low SNR user equipment.

Channel feedback information enables a scheduler located for example in a base station, to decide which user equipment should be served in parallel. The user equipment is configured to send three types of channel feedback information to the base station: CQI, RI and PMI. CQI is an important part of channel information feedback. The CQI provides the base station with information about link adaptation parameters which the user equipment supports at the time. The CQI is utilized to determine the coding rate and modulation alphabet, as well as the number of spatially multiplexed data streams. RI is short for Rank Indicator or Rank Information and is the user equipment recommendation for the number of layers, i.e. streams to be used in spatial multiplexing. The skilled person will understand that this is equivalent to the number of transport blocks preferred. RI is only reported when the user equipment operates in MIMO mode with spatial multiplexing. The RI may have the values 1 or 2 in a 2×2 MIMO configuration and it may have the values from 1 and up to 4 in a 4×4 MIMO configuration. The RI is associated with a CQI report. This means that the CQI is calculated assuming a particular RI value. The RI typically varies more slowly than the CQI. PMI is short for Precoding Matrix Indicator and provides information about a preferred precoding matrix in a codebook based precoding. PMI is only reported when the user equipment operates in MIMO. The number of precoding matrices in the codebook is dependent on the number of antenna ports on the base station. For example, four antenna ports enables up to 64 matrices dependent on the RI and the user equipment capability. A Precoding Control Indicator (PCI) indicates a specific precoding vector that is applied to the transmit signal at the base station.

FIG. 1 shows the messages exchanged between a base station and a user equipment during a typical data call set up. The method comprises the following steps, which steps may be performed in any suitable order:

Step 101

The base station broadcasts the Common Pilot Indicator CHannel (CPICH) which is a downlink channel with constant power and of a known bit sequence so that the user equipment may estimate the channel and compute the CQI and the PCI in step 102.

Step 102

From the CPICH in step 101, the user equipment estimates the channel and computes the CQI and the PCI.

For two antennas, the CQI is computed as follows:

$$CQI = \begin{cases} 15 \times CQI_1 + CQI_2 + 31 & \text{when 2 transport blocks are preferred by the UE} \\ CQI_S & \text{when 1 transport block is preferred by the UE} \end{cases}$$

Where the CQI is the channel quality per individual layer. $CQI_1$ represents the CQI of the first codeword, $CQI_2$ represents the CQI of the second codeword and $CQI_S$ represents the CQI of the single stream. The number 31 is used to differentiate between two codewords and one codeword. If the CQI is less than 31, it is one codeword transmission.

Step 103

The information computed in step 102, i.e. the CQI and PCI, along with a HARQ ACK/NAK is reported to the base station using the HS-DPCCH. The periodicity of HS-DPPCH is one subframe, e.g. 2 msec. The HS-DPCCH in the 3GPP Release 5 to Release 9 is based on a 1×SF256 solution. SF is short for Spreading Factor. The structure of the HS-DPCCH is shown in FIGS. 2a and 2b. FIG. 2a illustrates a general location of the PCI and CQI in the structure and FIG. 2b illustrates and example of how the PCI and the CQI are located in the structure. As well-known, the HS-DPCCH subframe structure comprises one slot for HARQ ACK/NACK transmissions and two slots for CQI/PCI transmissions. In the following, even though the text or the drawings refer to a HARQ ACK, it is appreciated that this may also be a HARQ NACK. ACK is short for ACKnowledgement and NACK is short for Not ACKnowledgement.

The HS-DPCCH subframe structure in FIGS. 2a and 2b for a Transmission Time Interval (TTI)=2 ms comprises a HARQ ACK or NACK which notifies the base station that the user equipment has received correct downlink data or not. The field defines like this: 1-NACK, 0-ACK, i.e. 1 represents NACK and 0 represents ACK. The CQI reflects the PCI based on CPICH strength. Each subframe comprises a HARQ ACK/NACK, two CQI-fields and one PCI field. In other words, every subframe comprises the same fields.

For the 3GPP Release 7 which covers MIMO, the HARQ ACK/NACK codebook comprises six codewords plus PREamble/POSTamble (PRE/POST) information.

In the 3GPP Release 7 there are 5 or 2×4 bits allocated for describing the CQI depending on the CQI type. There are 30 or 15 CQI values per stream for rank 1 and rank 2, respectively. The rank may vary from one up to the minimum of number of transmit and receive antennas. The rank determines how many layers, also referred to as the transmission rank, which may be successfully transmitted simultaneously. The rank is implicitly signalled via the CQI. Furthermore CQIs for each stream are signalled independent of each other. In addition to CQI bits there are 2 bits allocated for signaling the preferred precoding information. The seven (or ten) information bits are then encoded into twenty channel bits that are transmitted during the second and third slot.

Returning to FIG. 1.

Step 104

Once the base station receives the CQI, PCI and HARQ ACK/NACK, it allocates the required channelization codes, modulation and coding, precoding channel index to the user equipment after scheduling to be used for the downlink transmission.

Step 105

The base station transmits the information about the allocated channelization codes, modulation and coding, precoding channel index from step 104 to the user equipment using the HS-SCCH.

Step 106

The user equipment detects the transmission on the HS-SCCH, i.e. the user equipment's receives the information transmitted in step 105.

Step 107

Once the user equipment has detected the transmission on the HS-SCCH, the base station starts its downlink transmission to the user equipment through a data traffic channel using the HS-PDSCH. The base station periodically transmits to the user equipment for every TTI, which is 2 msec in HSDPA.

In general, HS-DPCCH design depends on many factors like the number of codewords supported, the number of HARQ processes, the precoding codebook etc. Four branch MIMO should support two codewords and two HARQ processes.

The current HSDPA system (3GPP Release 7-10) supports one or two transmit antennas at the base station. For these current systems, the user equipment measures the channel from channel sounding and reports the channel state information in one sub frame. A sub frame may be defined as for example one TTI which may be e.g. 1 ms or 2 ms. Typically this report consists of the CQI which explicitly indicates the RI and the PCI. The user equipment sends this report periodically for every subframe, i.e. for every TTI to the base station. Once the base station receives this report it grants the Modulation and Coding Scheme (MCS), number of codes, rank and the PCI to each specific user equipment based on a scheduler metric. Based on this information, the base station may optimize the downlink throughput for each TTI.

SUMMARY

An objective of embodiments herein is therefore to provide improved scheduling of the user equipment in a wireless communications system.

According to a first aspect, the object is achieved by a method in a user equipment for enabling a base station to schedule the user equipment in a wireless communication system. The wireless communication system is in MIMO mode and comprises four transmit antennas. The user equipment is connected to the base station via a radio carrier. The user equipment determines Channel State Information (CSI) based on information about the CPICH. The CSI comprises the CQI, the RI, the PCI and the HARQ ACK/NACK. The user equipment transmits the CSI to the base station over a plurality of TTIs, enabling the base station to schedule the user equipment.

According to a second aspect, the object is achieved by a method in the base station for scheduling a user equipment in the wireless communication system. The wireless communication system is in MIMO mode and comprises four transmit antennas. The base station is connected to the user equipment via the radio carrier. The base station receives the CSI from the user equipment over the plurality of TTIs. The CSI comprises the CQI, the RI, the PCI and the HARQ ACK/NACK. The base station schedules the user equipment based on the received CSI.

According to a third aspect, the object is achieved by the user equipment for enabling a base station to schedule the user equipment in the wireless communication system. The wireless communication system is in MIMO mode and comprises four transmit antennas. The user equipment is connected to the base station via the radio carrier. The user equipment comprises a determining unit which is configured to determine the CSI based on information about the CPICH. The CSI comprises the CQI, the RI, the PCI and the HARQ ACK/NACK. The user equipment further comprises a transmitter configured to transmit the CSI to the base station over the plurality of TTIs, enabling the base station to schedule the user equipment.

According to a fourth aspect, the object is achieved by the base station for scheduling the user equipment in the wireless communication system. The wireless communication system is in MIMO mode and comprises four transmit antennas. The base station is connected to the user equipment via the radio carrier. The base station comprises a receiver which is configured to receive the CSI from the user equipment over the plurality of TTIs. The CSI comprises the CQI, the RI, the PCI and the HARQ ACK/NACK. The base station further comprises a scheduler which is configured to schedule the user equipment based on the received CSI.

Since the HARQ ACK/NACK, the CQI, the RI and the PCI are transmitted in a structure adapted to four branch MIMO feedback channel, the scheduling of user equipment in the wireless communications system is improved. Therefore, the user equipment may be scheduled after the first sub frame rather than waiting for the complete channel state information (three sub frames), and thereby reducing the potential delay of one sub frame delay. This gives a significant improvement for delay sensitive data applications.

Embodiments herein afford many advantages, of which a non-exhaustive list of examples follows:

The embodiments herein may have an advantage of improving the downlink spectral efficiency and increasing the average spectral efficiency.

Another advantage of the embodiments herein may be that they enhance the spatial multiplexing gains and improve beam forming capabilities The embodiments herein provide an advantage of that it may require minimal standard changes as it may be used for four branch MIMO feedback channel design.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The introduction of four branch MIMO will require a new feedback channel structure to send the CQI/PCI information from the user equipment to the base station. Since it is recommend using two codeword four branch MIMO, the same HS-DPCCH structure may be used for four branch MIMO as used for two branch MIMO. A problem is how to report the RI and the PCI by using the same HS-DPCCH structure as of today since the four branch MIMO requires more bits to report the RI and the PCI.

Figure 1:
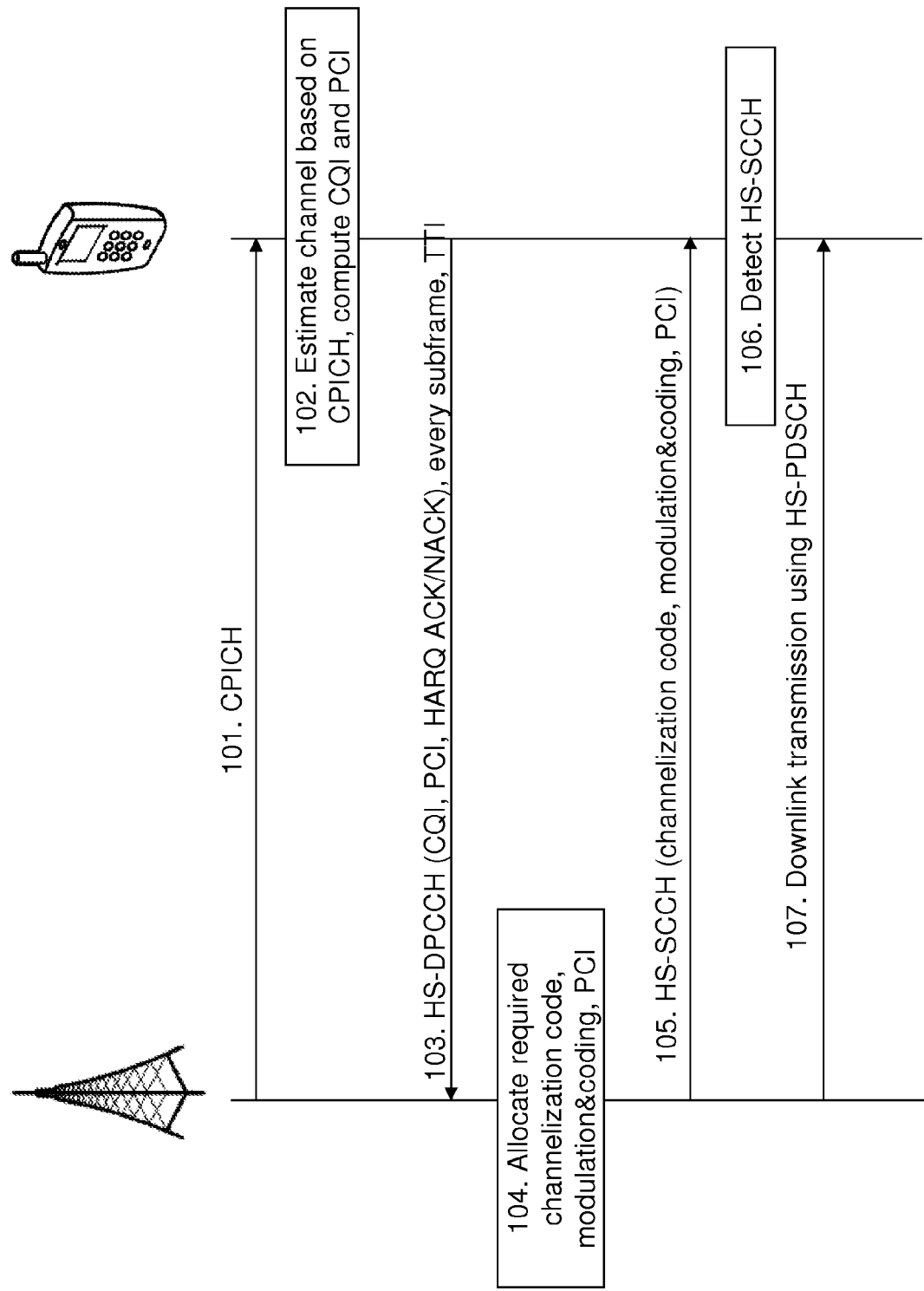
FIG. 1 is a signaling diagram illustrating a method according to the prior art.
Figure 2A:
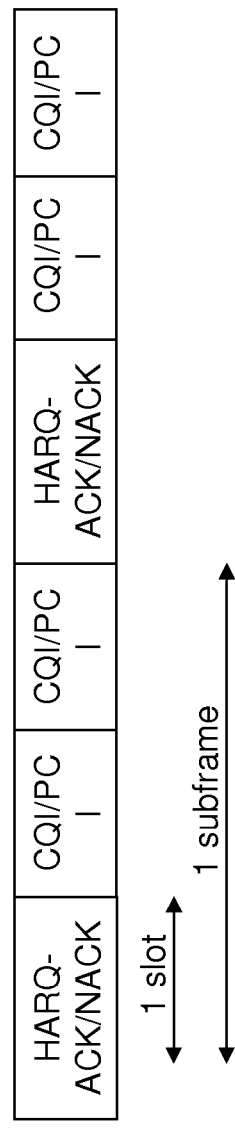
FIG. 2a-b are schematic block diagrams illustrating a HS-DPCCH structure.
Figure 2B:
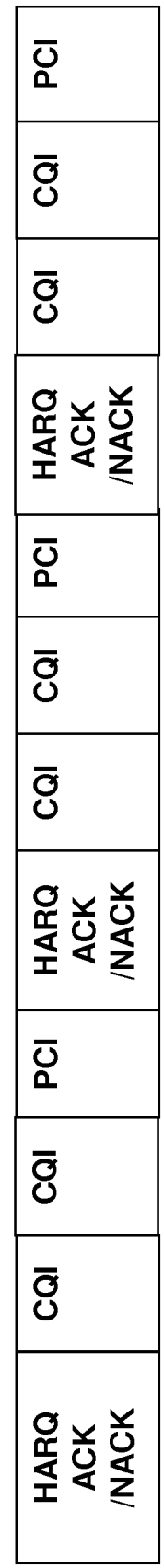
Figure 3:
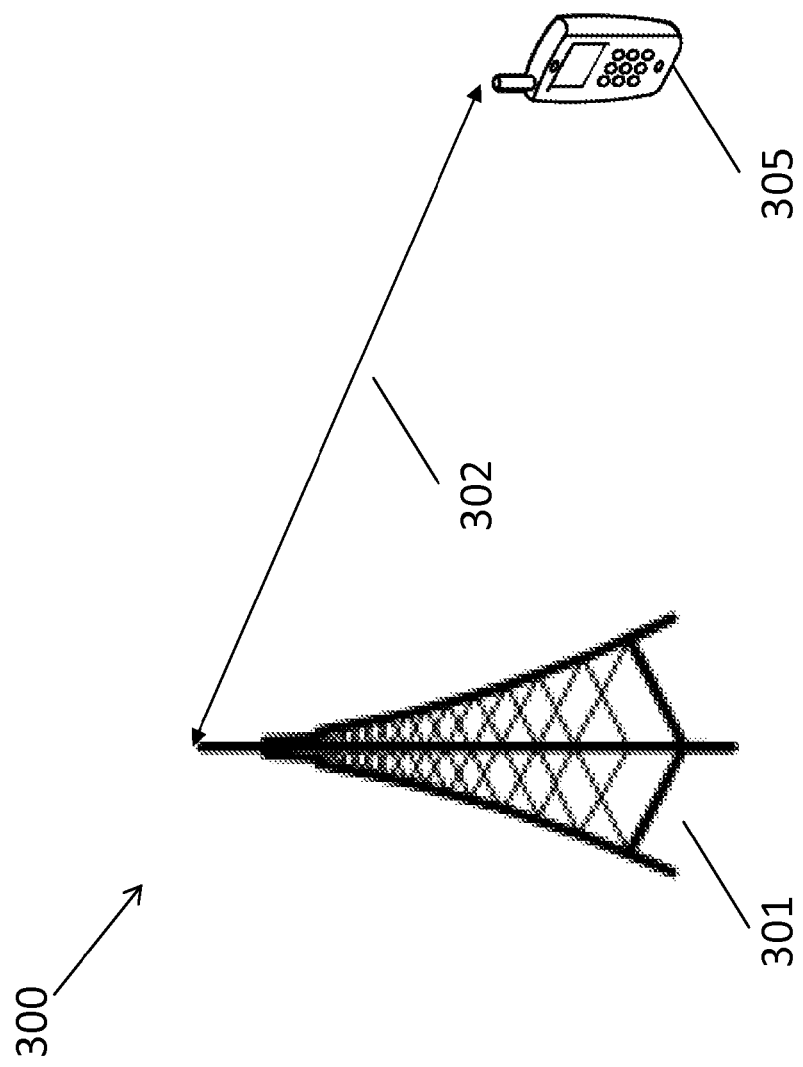
FIG. 3 is a schematic block diagram illustrating embodiments of a communications system.

FIG. 3 depicts a wireless communications system 300 in which embodiments herein may be implemented. The communications system 300 may in some embodiments apply to one or more radio access technologies such as for example Long Term Evolution (LTE), LTE Advanced, Wideband Code Division Multiple Access (WCDMA), HSPA, Global System for Mobile Communications (GSM), or any other 3GPP radio access technology. The wireless communications system 300 is in MIMO mode and comprises four transmit antennas. The wireless communication system 300 may be referred to as a four-way transmit antenna wireless communications system, a four branch MIMO system or a system in MIMO mode with four transmit antennas.

The wireless communication system 300 comprises a base station 301 serving a cell. The base station 301 may be a base station such as a NodeB, an eNodeB, or any other unit capable to communicate over a radio carrier 302 with a user equipment 305 being present in the cell.

The user equipment 305 may be any suitable communication device or computational device with communication capabilities capable to communicate with the base station 301 over the radio channel 302, for instance but not limited to mobile phone, smart phone, Personal Digital Assistant (PDA), tablet computer, laptop, MP3 player or portable DVD player (or similar media content devices), digital camera, or even stationary devices such as a PC. A PC may also be connected via a mobile station as the end station of the broadcasted/multicast media. The user equipment 305 may also be an embedded communication device in e.g. electronic photo frames, cardiac surveillance equipment, intrusion or other surveillance equipment, weather data monitoring systems, vehicle, car or transport communication equipment, etc. The user equipment 305 is referred to as UE in some of the figures.

For the 3GPP Release 7 describing MIMO, the HARQ ACK/NACK codebook comprises six codewords plus PRE/POST. From a HARQ ACK/NACK design perspective it seems that for two codewords, two HARQ processes use the HARQ ACK/NACK codebook (joint codebook for all ranks) from the 3GPP Release 7.

Re-using the multicarrier evolution steps makes it straightforward to extend the HARQ ACK/NACK signalling for 4×4 DL MIMO with multiple carriers. For two carriers, some of the 3GPP Release 9 codewords may be re-used to jointly code the ACK/NACK. Similar to multicarrier, it is necessary to include cases where one carrier is DTXed. For three to four carriers it is natural to re-use the 3GPP Release 10 multicarrier operation by grouping carriers two and two and introducing a DTX codeword. DTX is short for discontinuous transmission.

The method for enabling the base station 301 to schedule the user equipment 305 in a wireless communication system 300 according to some embodiments will now be described with reference to the combined signaling diagram and flowchart depicted in FIG. 4. The wireless communication system 300 is in MIMO mode and comprises four transmit antennas. The method comprises the following steps, which steps may as well be carried out in another suitable order than described below.

Step 401

The base station 301 broadcasts the CPICH which is a downlink channel with constant power and of a known bit sequence, so that the user equipment 305 may estimate or measure the channel 302 and compute the CQI, the RI and the PCI in step 402.

Step 402

From the CPICH in step 401, the user equipment 305 determines the CSI, i.e. it estimates or measures the channel 302 and computes the CQI, the RI and the PCI.

For two antennas, the CQI is computed as follows:

$$CQI = \begin{cases} 15 \times CQI_1 + CQI_2 + 31 & \text{when 2 transport blocks are preferred by the UE} \\ CQI_S & \text{when 1 transport block is preferred by the UE} \end{cases}$$

Where CQI is the channel quality per individual layer. $CQI_1$ represents the CQI of the first codeword, $CQI_2$ represents the CQI of the second codeword and $CQI_S$ represents the CQI of the single stream. The number 31 is used to differentiate between two codewords and one codeword. If the CQI is less than 31, it is one codeword transmission.

Step 403

For the four branch MIMO with two HARQ processes, the user equipment 305 informs the base station 301 periodically about the parameters computed in step 402 through the feedback channel. The HARQ ACK/NACK information has the same structure that of 3GPP Release 7.

For the CQI per codeword, two codewords are needed (five bits each) according to the embodiments herein since two codewords are defined in the standard. For two HARQ processes, two CQIs are needed, which is the same as that of 3GPP Release 7. The CQI tables of 3GPP Release 7 may be reused.

As mentioned earlier, the RI indicates the number of layers the user equipment 305 is preferring (two bits), i.e. the number of transport blocks preferred. Since up to four streams are possible, it is recommended to use two dedicated bits for indicating rank information.

For the PCI in the RI (four bits), four bits are assumed to indicate the precoding weights. One question is whether a single codebook (single feedback rate) will be used or a product codebook comprising an inner codebook that capture the correlation within each polarization state and an outer codebook which is used to co-phase or rotate the two polarization directions. Since the inner precoder focuses on long term properties of the channel and the outer precoder takes care of short term properties, different feedback rates may be used for the two precoders.

Figure 5A:
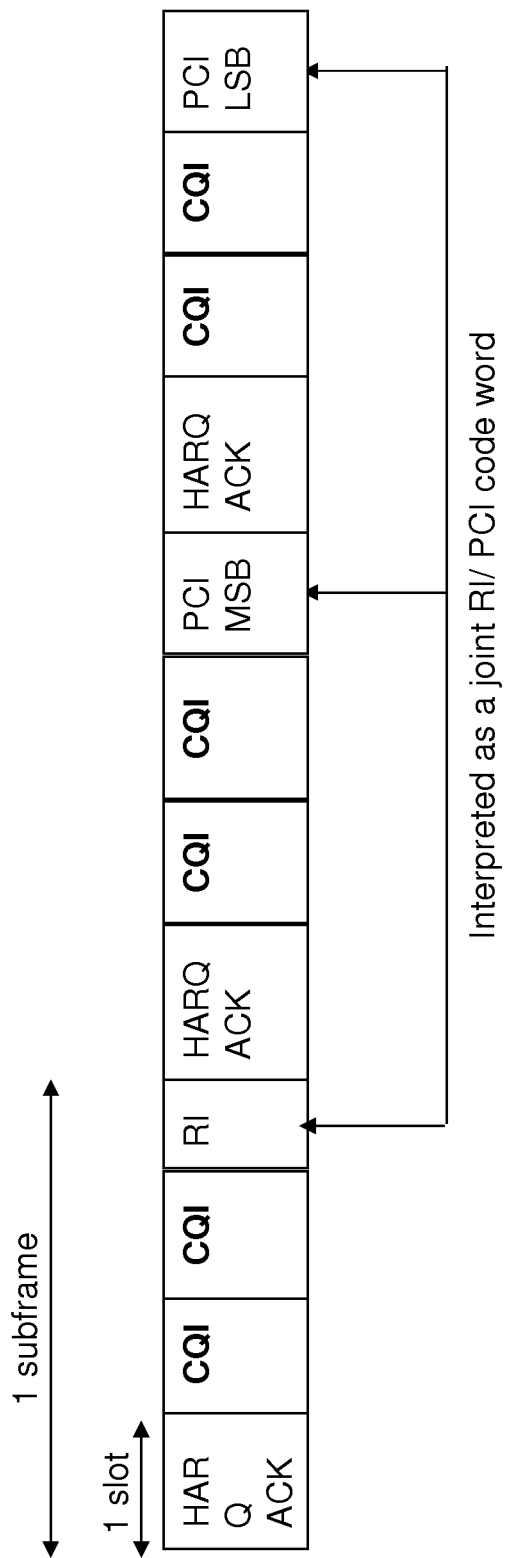
FIG. 5a-c are schematic block diagrams illustrating embodiments of a HS-DPCCH structure.

In the following, some example design options for HS-DPCCH with two HARQ processes are described:
Example 1: Time multiplexed RI/PCI
Example 2: Time multiplexed CQI
Example 3: CQI/RI/PCI in one subframe Example 1 is illustrated in FIG. 5a. FIG. 5a depicts the HS-DPCCH structure with time multiplexed RI and PCI. Observe that the user equipment preferred rank information is indicated in the first TTI, i.e. subframe, and the PCI bits are time multiplexed in the next two TTIs. TTI may also be referred to as a reporting interval. In FIG. 5a, PCI MSB indicates the most significant bits of PCI and PCI LSB indicates least significant bits of PCI. MSB is short for Most Significant Bit and LSB is short for Least Significant Bit. The main idea behind this structure is that rank information, which is a second order statics of the channel changes slowly and delayed information of RI/PCI does not impact the link level performance. Observe that in this case the reported CQI in the second and third TTIs should be conditioned on the RI reported in the first TTI. Note that the PCI is multiplexed in the next two TTIs is only an example. The PCI may be multiplexed in a plurality of TTIs after the first TTI. In FIG. 5a, RI, PCI MSB and PCI LSB are interpreted as a joint RI/PCI codeword.

Figure 6:
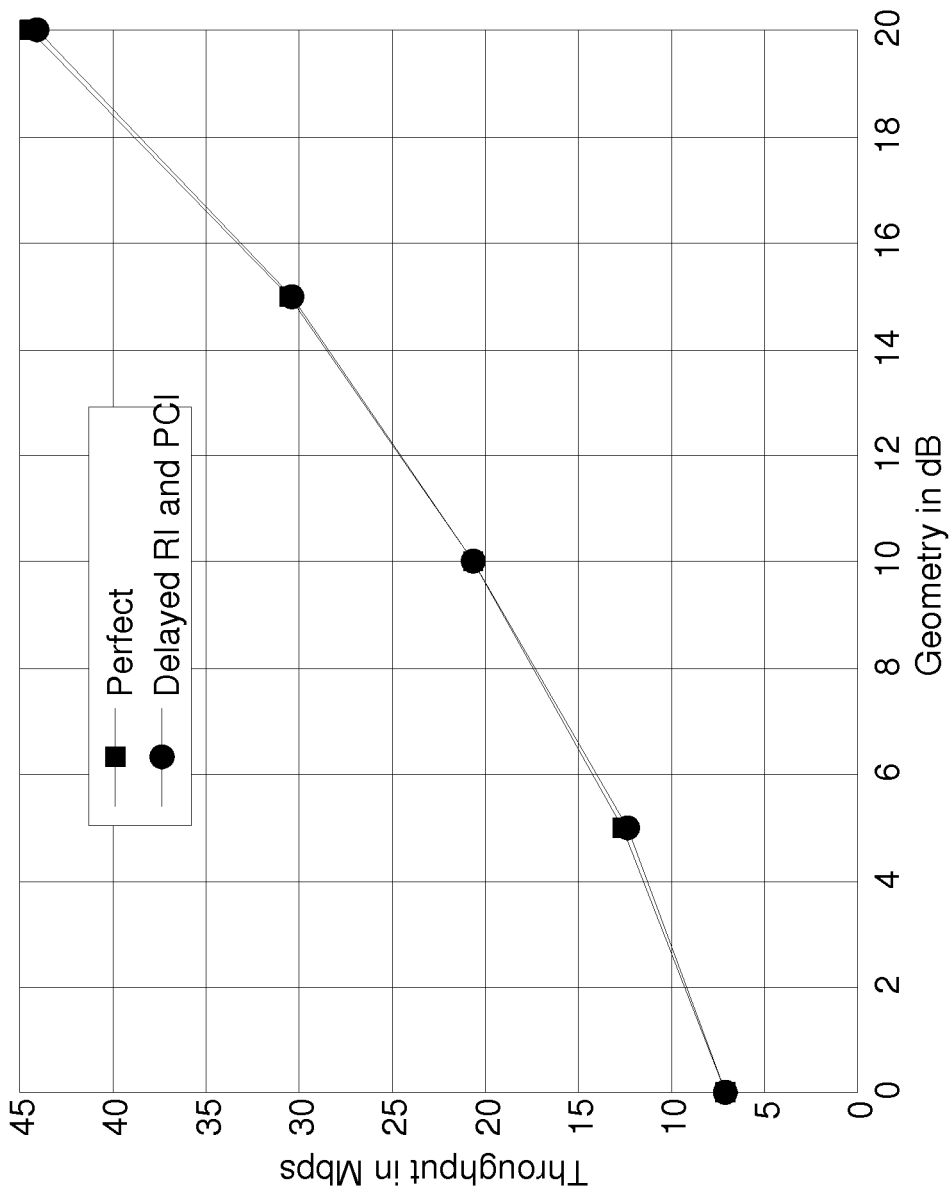
FIG. 6 is a graph illustrating simulations of link level performance.

FIG. 6 shows a simulation of a link level performance for the case where perfect CQI/RI/PCI is transmitted in one TTI and the case where the CQI is transmitted every TTI and RI/PCI are time multiplexed over three TTIs. The x-axis of FIG. 6 represents decibel (dB). The y-axis of FIG. 6 represents the throughput in Mbps. The squared line illustrates the perfect CSI, where the CQI/RI/PCI is transmitted in the same TTI. The circled line illustrates the delayed CSI, where the CQI is transmitted every TTI and RI/PCI are time multiplexed over three TTIs. The link level simulations in FIG. 6 are shown for PA3 channel. It may be observed that the performance gap between these two graphs is very small as the performance depends on the CQI rather than the RI/PCI. The HARQ ACK or NACK notifies the base station 301 whether the user equipment 305 has received correct downlink data or not. The field is defined like this: 1-NACK, 0-ACK, in other words NACK is represented by the value one and ACK is represented by the value zero.

Returning to FIG. 5.

Figure 5B:
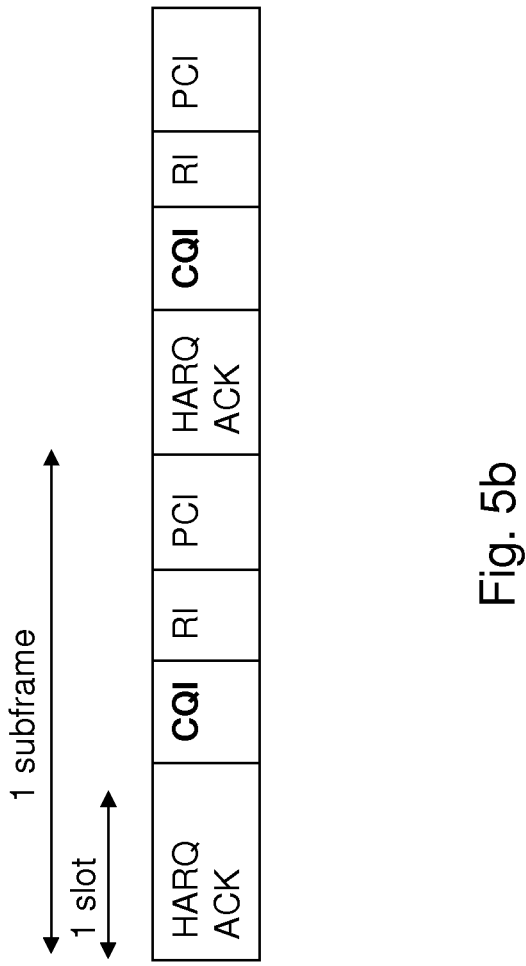

Example 2 is depicted in FIG. 5b showing the HS-DPCCH structure with time multiplexed CQI. In the first TTI, i.e. subframe, the CQI for the first codeword is transmitted and the second codeword is transmitted. RI and PCI bits are transmitted in the every TTI.

Figure 5C:
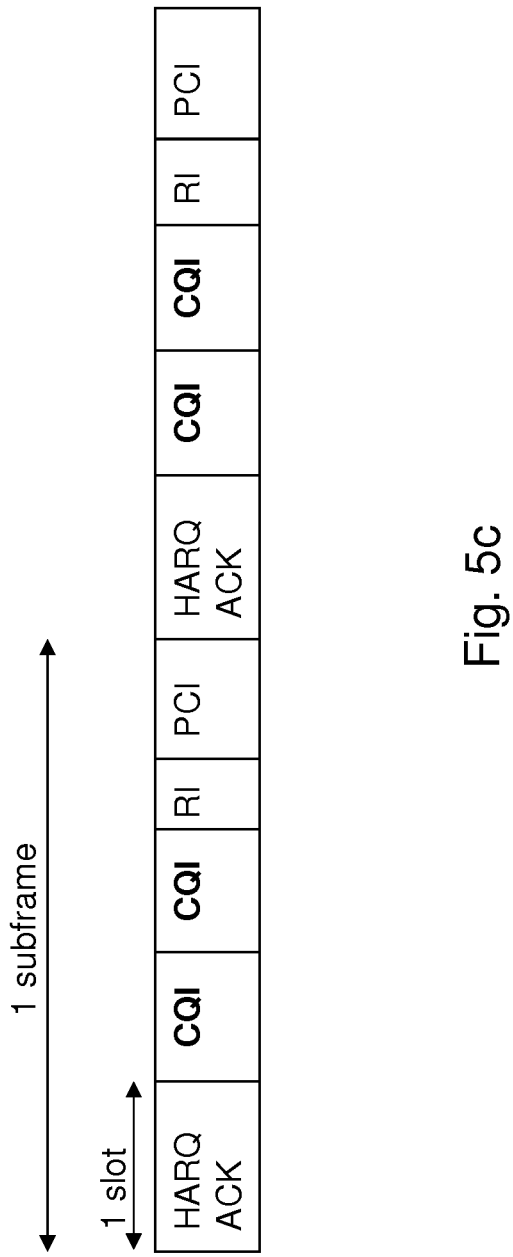

Example 3 is depicted in FIG. 5c showing the structure for this design option. CQI/RI/PCI bits are transmitted in one TTI, i.e. subframe. Observe that in this case, it is necessary to change the SF or the encoder as all the bits are does not fit into the existing structure of HS-DPCCH. The spreading factor describes how much the signal is spread.

In addition to the above design options exemplified in FIGS. 5a-c, HS-DPCCH may be optimized for lower ranks similar to Type B reporting in 3GPP Release 7 and for higher ranks any one of the design options may be used.

Returning to FIG. 4.

Step 404

Once the base station 301 has received the CSI reporting in step 403, the base station 301 schedules the transport blocks, modulation and coding scheme, precoding control index. Ideally, three TTIs may be needed to schedule the user equipment 305 as it gets the complete channel information only after three TTIs. Instead of waiting for getting the complete CSI from the user equipment 305, the base station 301 may start scheduling the user equipment 305 once it gets the RI, i.e. after receiving the first HI. For scheduling, the base station 301 may choose a random PCI within the subset indicated by the RI. The random chosen PCI may not be exactly the same as the original PCI, which will be received in the second TTI. However, the impact due to the PCI error is minimal.

Step 405

The information about the transport blocks, modulation and coding scheme, precoding control index from step 404 is transmitted from the base station 301 to the user equipment 305 using the HS-SCCH.

Step 406

The user equipment 305 detects the HS-SCCH.

Step 407

Once the user equipment 305 has detected the HS-SCCH, the downlink transmission from the base station 301 starts through the data traffic channel using the HS-PDSCH. The base station periodically transmits to the user equipment for every TTI, which is 2 msec in HSDPA.

Note that although the description above assumes that the four branch MIMO is applied to a single downlink carrier it is straightforward to extend the embodiments to scenarios where a four branch MIMO is used in combination with multicarrier HSDPA operation.

Figure 7:
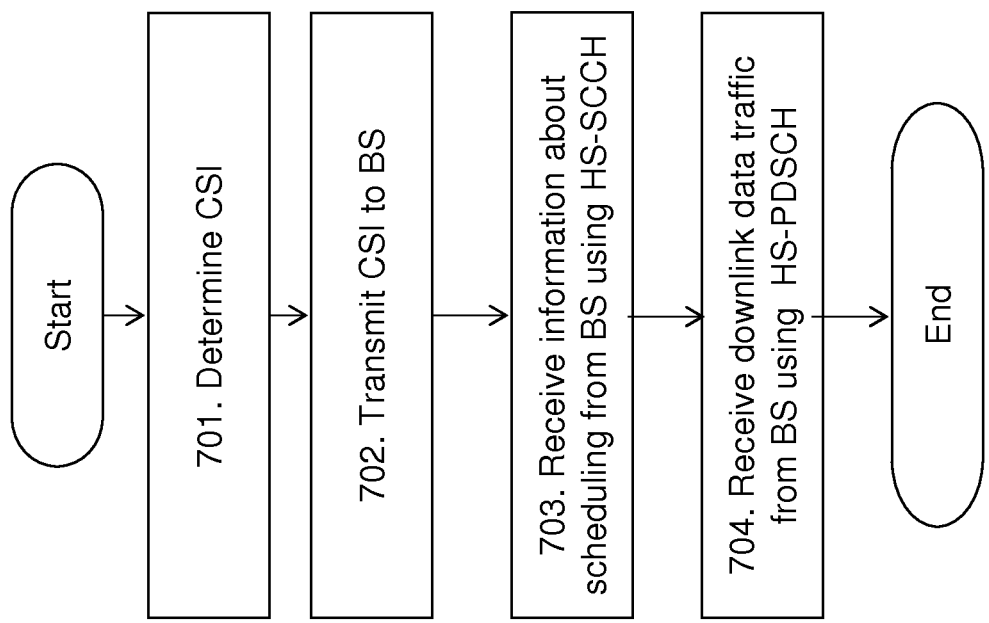
FIG. 7 is a flow chart illustrating embodiments of a method in a user equipment.

The method described above will now be described seen from the perspective of the user equipment 305. FIG. 7 is a flowchart describing the present method in the user equipment 305 for enabling the base station 301 to schedule the user equipment 305 in the wireless communication system 300. The wireless communication system 300 is in MIMO mode and comprises four transmit antennas. The user equipment 305 is connected to the base station 301 via the radio carrier 302. In some embodiments, the radio carrier 302 is a single downlink carrier or a multicarrier. In some embodiments, the wireless communication system 300 is a HSDPA system. The method comprises the following steps to be performed by the user equipment 305, which steps may be performed in any suitable order:

Step 701

Figure 4:
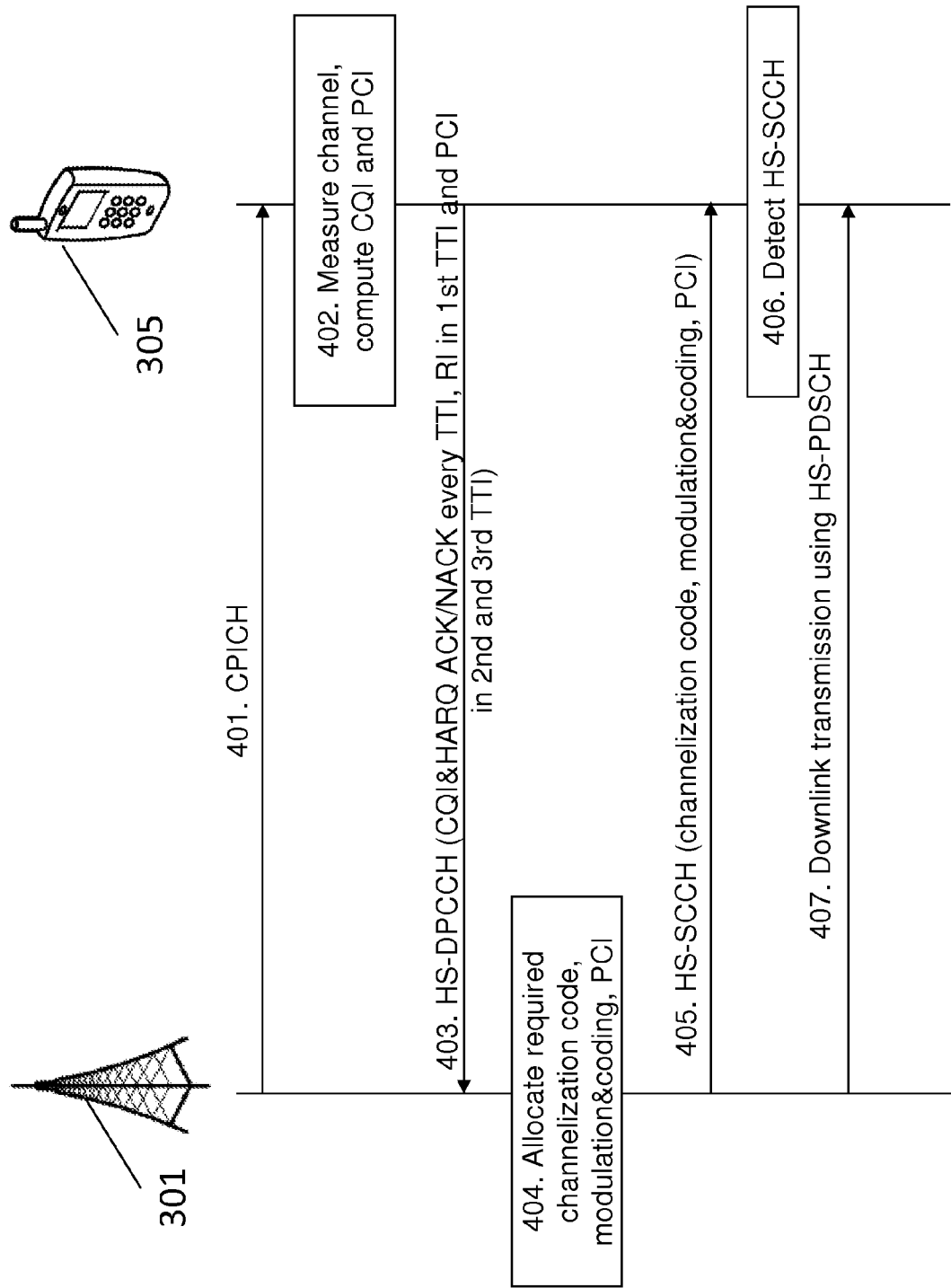
FIG. 4 is a signaling diagram illustrating embodiments of a method.

This step corresponds to step 402 in FIG. 4. The user equipment 305 determines the CSI based on information about the CPICH. The CSI comprises the CQI, the RI, the PCI and the HARQ ACK/NACK. The CSI is needed by the base station 301 in order to schedule the user equipment 305.

Step 702

This step corresponds to step 403 in FIG. 4. The user equipment 305 transmits the CSI to the base station 301 over a plurality of TTIs.

In some embodiments, the HARQ ACK/NACK and the CQI is transmitted in each TTI in the plurality of TTIs, and the RI and the PCI are time multiplexed in a subplurality of the plurality of TTIs.

In some embodiments, the HARQ ACK/NACK, the RI and the PCI are transmitted in each TTI in the plurality of TTIs, and the CQI is time multiplexed in a subplurality of the plurality of TTIs.

In some embodiments, the HARQ ACK/NACK, the RI, the PCI and the CQI are transmitted in each TTI of the plurality of TTIs.

In some embodiments, the CSI is transmitted to the base station 301 using the HS-DPCCH. In some embodiments, the TTI is a subframe.

The user equipment 305 may transmit the HARQ ACK/NACK, the CQI and the RI in the first TTI.

The user equipment 305 may transmit the HARQ ACK/NACK, the CQI and the PCI in a second TTI. The PCI transmitted in the second TTI indicates the most significant bits of the PCI, referred to as PCI MSB.

The user equipment 305 may transmit the HARQ ACK/NACK, the CQI and the PCI in a third TTI. The PCI transmitted in the third TTI indicates the least significant bits of the PCI, referred to as PCI LSB.

Step 703

This step corresponds to step 405 in FIG. 4. The user equipment 305 receives information about the scheduling from the base station 301 using the HS-SCCH.

Step 704

This step corresponds to step 407 in FIG. 4. The user equipment 305 receives downlink data traffic from the base station 301 using the HS-PDSCH.

Figure 8:
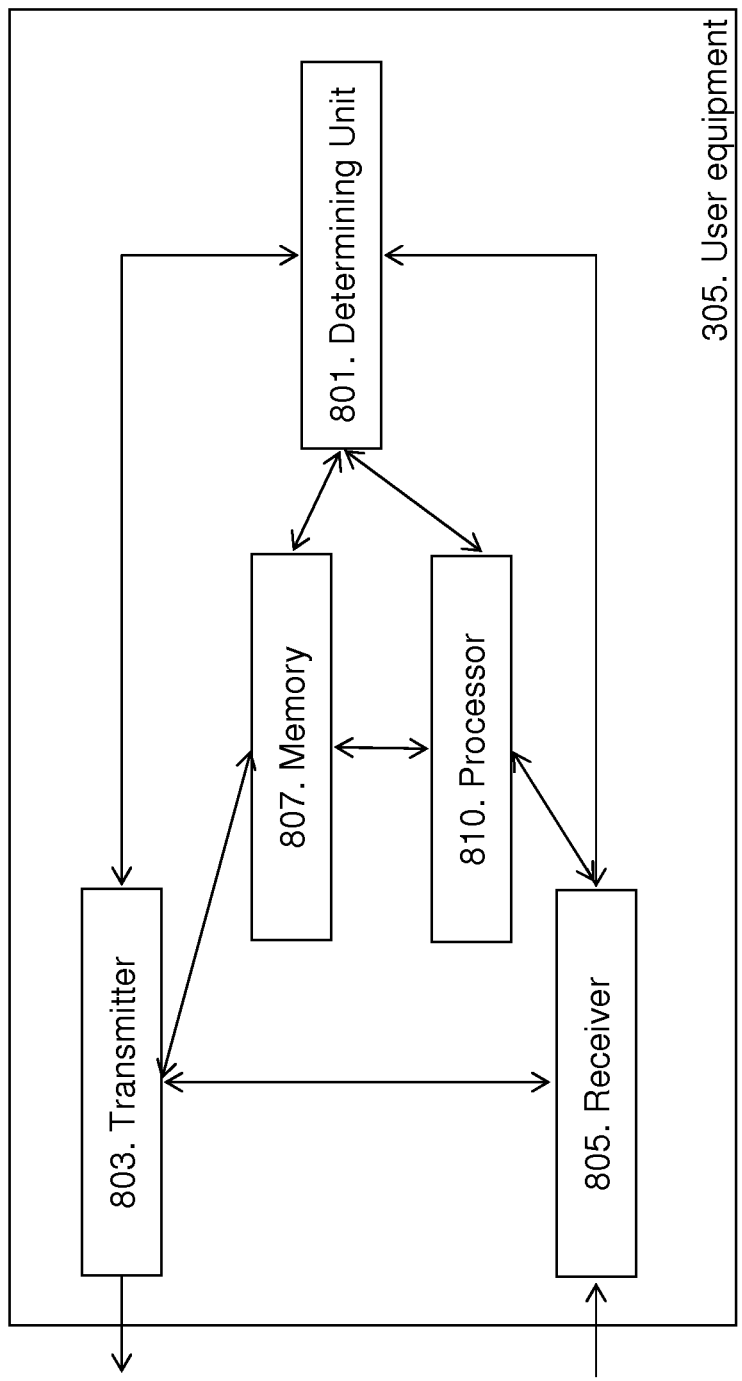
FIG. 8 is a schematic block diagram illustrating embodiments of a user equipment.

To perform the method steps shown in FIG. 7 for enabling a base station 301 to schedule the user equipment 305 in the wireless communication system 300 the user equipment 305 comprises an arrangement as shown in FIG. 8. The wireless communication system 300 is in MIMO mode and comprises four transmit antennas. The user equipment is connected to the base station 301 via the radio carrier 302. In some embodiments, the radio carrier 302 is a single downlink carrier or a multicarrier. In some embodiments, the wireless communication system 300 is a HSDPA system.

The user equipment 305 comprises a determining unit 801 configured to determine the CSI based on information about the CPICH. The CSI comprises the CQI, the RI, the PCI and the HARQ ACK/NACK.

The user equipment 305 further comprises a transmitter 803 configured to transmit the CSI to the base station 301 over a plurality of TTIs, enabling the base station 301 to schedule the user equipment 305. The HARQ ACK/NACK and the CQI may be transmitted in each TTI in the plurality of TTIs, and the RI and the PCI may be time multiplexed in a subplurality of the plurality of TTIs. In another embodiment, the HARQ ACK/NACK, the RI and the PCI are transmitted in each TTI in the plurality of TTIs, and the CQI is time multiplexed in a subplurality of the plurality of TTIs. In a further embodiment, the HARQ ACK/NACK, the RI, the PCI and the CQI are transmitted in each HI in the plurality of TTIs. The transmitter 803 is further configured to transmit the HARQ ACK/NACK, the CQI and the RI in a first TTI, to transmit the HARQ ACK/NACK, the CQI and the PCI in a second TTI, and to transmit the HARQ ACK/NACK, the CQI and the PCI in a third TTI. The PCI transmitted in the second HI indicates the most significant bits of the PCI (PCI MSB) and the PCI transmitted in the third HI indicates the least significant bits of the PCI (PCI LSB). In some embodiments, the CSI is transmitted to the base station 301 using the HS-DPCCH. In some embodiments, the TTI is a subframe.

In some embodiments, the user equipment 305 further comprises a receiver 805 configured to receive information about the scheduling from the base station 301 using the HS-SCCH, and to receive downlink data traffic from the base station 301 using the HS-PDSCH.

The user equipment 305 may further comprise a memory 807 comprising one or more memory units. The memory 807 is arranged to be used to store data, CQI, PCI, RI, HARQ ACK/NACK, threshold values, time periods, configurations, schedulings, and applications to perform the methods herein when being executed in the user equipment 305.

Those skilled in the art will also appreciate that the determining unit 801, the transmitter 803 and the receiver 805 described above may refer to a combination of analog and digital circuits, and/or one or more processors configured with software and/or firmware, e.g. stored in a memory, that when executed by the one or more processors. One or more of these processors, as well as the other digital hardware, may be comprised in a single Application-Specific Integrated Circuit (ASIC), or several processors and various digital hardware may be distributed among several separate components, whether individually packaged or assembled into a System-on-a-Chip (SoC).

Figure 9:
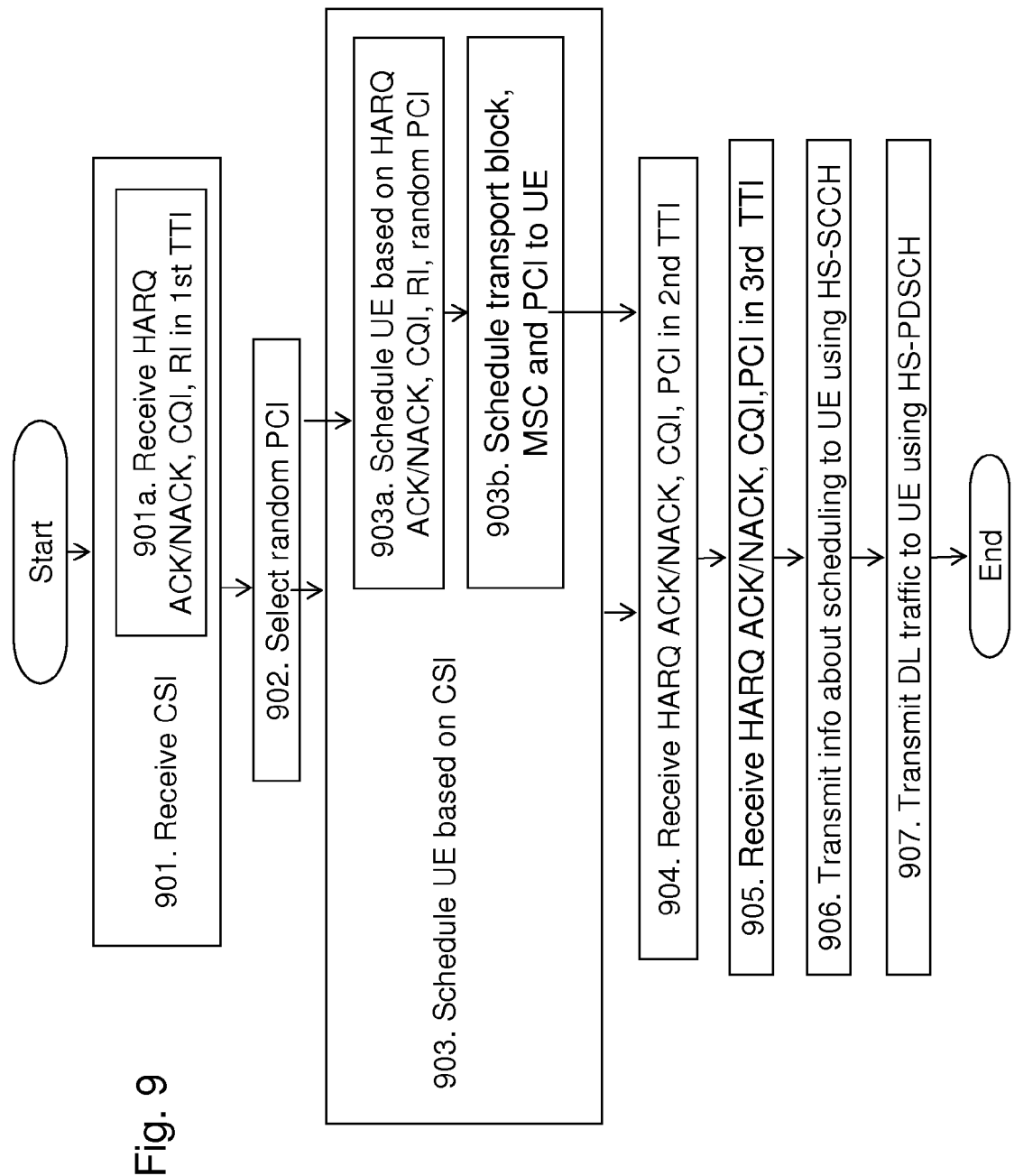
FIG. 9 is a flow chart illustrating embodiments of a method in a base station.

The method described above will now be described seen from the perspective of the base station 301. FIG. 9 is a flowchart describing the present method in the base station 301 for scheduling the user equipment 305 in the wireless communication system 300. The wireless communication system 300 is in MIMO mode and comprises four transmit antennas. The base station 301 is connected to the user equipment 305 via the radio carrier 302. In some embodiments, the radio carrier 302 is a single downlink carrier or a multicarrier. In some embodiments, the wireless communication system 300 is a HSDPA system. The method comprises the further steps to be performed by the base station 301, which steps may be performed in any suitable order:

Step 901

The base station 301 receives the CSI from the user equipment 305 over a plurality of TTIs. The CSI comprises the CQI, the RI, the PCI and the HARQ ACK/NACK.

In some embodiments, the HARQ ACK/NACK and the CQI are received in each TTI in the plurality of TTIs, and the RI and the PCI are time multiplexed in a subplurality of the plurality of TTIs. In some embodiments, the HARQ ACK/NACK, the RI and the PCI are received in each TTI in the plurality of TTIs, and the CQI is time multiplexed in a subplurality of the plurality of TTIs. In some embodiments, the HARQ ACK/NACK, the RI, the PCI and the CQI are received in each TTI in the plurality of TTIs.

In some embodiments, the CSI is received from the user equipment 305 using the HS-DPCCH. In some embodiments, the TTI is a subframe.

Step 901a

In some embodiments, the base station 301 receives the HARQ ACK/NACK, the CQI and the RI in the first TTI.

Step 902

In some embodiments, the base station 301 selects a random PCI based on the received RI.

Step 903

The base station 301 schedules the user equipment 305 based on the received CSI.

Step 903a The base station 301 schedules the user equipment 305 based on the received HARQ ACK/NACK, the CQI, the RI and the random PCI when the user equipment has received the RI.

Step 903b

In some embodiments, the base station 301 schedules a transport block, a modulation and coding scheme and a precoding control index to the user equipment 305.

Step 904

The base station 301 receives the HARQ ACK/NACK, the CQI and the PCI in a second TTI.

Step 905

The base station 301 receives the HARQ ACK/NACK, the CQI and the PCI in a third TTI. The PCI received in the second TTI indicates the most significant bits of the PCI and the PCI received in the third TTI indicates the least significant bits of the PCI.

Step 906

In some embodiments, the base station 301 transmits information about the scheduling to the user equipment 305 using the HS-SCCH.

Step 907

In some embodiments, the base station 301 transmits downlink data traffic to the user equipment 305 using the HS-PDSCH.

Figure 10:
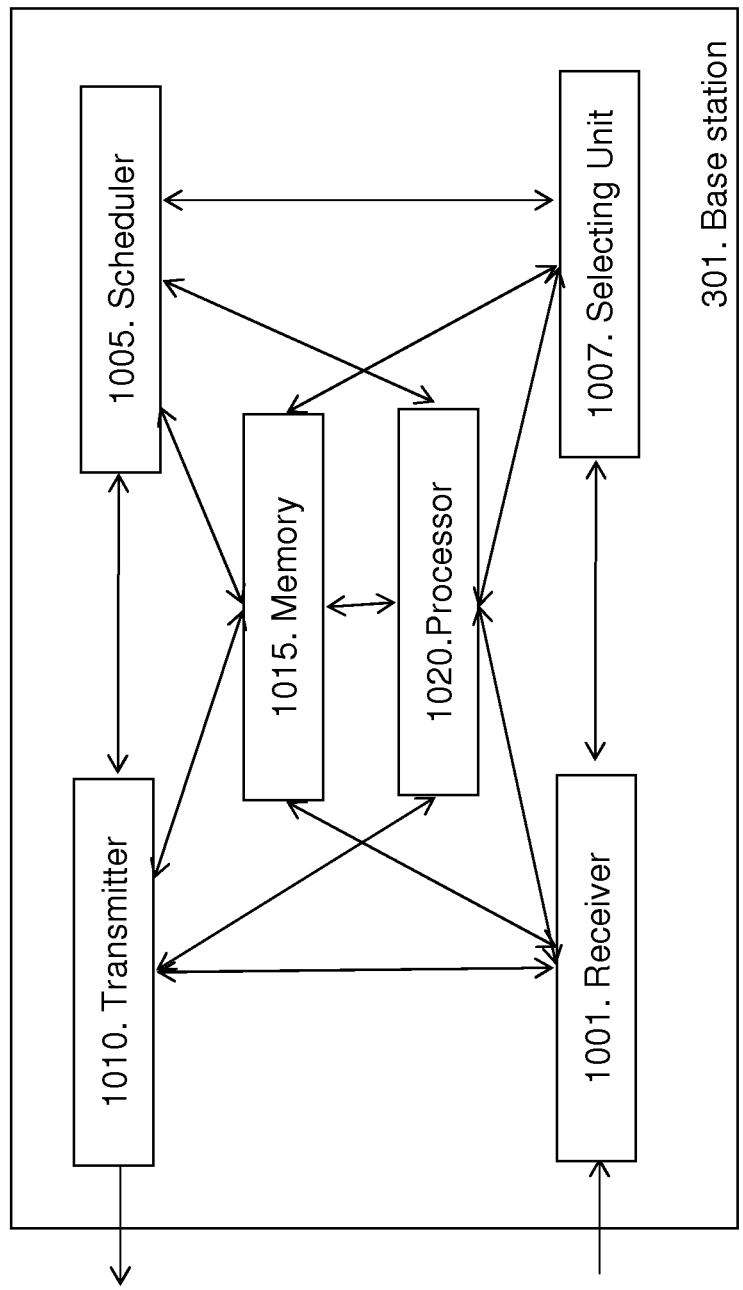
FIG. 10 is a schematic block diagram illustrating embodiments of a base station.

To perform the method steps shown in FIG. 9 for scheduling a user equipment 305 in a wireless communication system 300 the base station 301 comprises an arrangement as shown in FIG. 10. The wireless communication system 300 is in MIMO mode and comprises four transmit antennas. The base station 301 is connected to the user equipment 305 via the radio carrier 302. In some embodiments, the radio carrier 302 is a single downlink carrier or a multicarrier. In some embodiments, the wireless communication system 300 is a HSDPA system.

The base station 301 comprises a receiver 1001 configured to receive the CSI from the user equipment 305 over a plurality of TTIs. The CSI comprises the CQI, the RI, the PCI and the HARQ ACK/NACK. In some embodiments, the HARQ ACK/NACK and the CQI are received in each TTI in the plurality of TTIs, and the RI and the PCI are time multiplexed in a subplurality of the plurality of TTIs. In some embodiments, the HARQ ACK/NACK, the RI and the PCI are received in each TTI in the plurality of TTIs, and the CQI is time multiplexed in a subplurality of the plurality of TTIs. In some embodiments, the HARQ ACK/NACK, the RI, the PCI and the CQI are received in each TTI in the plurality of TTIs.

In some embodiments, the receiver 1001 is further configured to receive the HARQ ACK/NACK, the CQI and the RI in a first TTI. In some embodiments, the receiver 1001 is further configured to receive the HARQ ACK/NACK, the CQI and the PCI in a second TTI. The receiver 1001 may be further configured to receive the HARQ ACK/NACK, the CQI and the PCI in a third TTI. The PCI received in the second TTI indicates the most significant bits of the PCI and the PCI received in the third TTI indicates the least significant bits of the PCI. In some embodiments, the CSI is received from the user equipment 305 using the HS-DPCCH. In some embodiments, the TTI is a subframe.

The base station 301 further comprises a scheduler 1005 configured to schedule the user equipment 305 based on the received CSI. In some embodiments, the scheduler 1005 is further configured to schedule the user equipment 305 based on the received HARQ ACK/NACK, the CQI, the RI and the random PCI when the user equipment has received the RI. In some embodiments, the scheduler 1005 is further configured to schedule a transport block, a modulation and coding scheme and a precoding control index to the user equipment 305.

In some embodiments, the base station 301 further comprises a selecting unit 1007 configured to select a random PCI based on the received RI.

In some embodiments, the base station 301 comprises a transmitter 1010 configured to transmit information about the scheduling to the user equipment 305 using the HS-SCCH, and to transmit downlink data traffic to the user equipment 305 using the HS-PDSCH.

The base station 301 may further comprise a memory 1015 comprising one or more memory units. The memory 1015 is arranged to be used to store data, HARQ ACK/NACK, CQI, RI, PCI, threshold values, time periods, configurations, schedulings, and applications to perform the methods herein when being executed in the base station 301.

Those skilled in the art will also appreciate that the receiver 1001, the scheduler 1005, the selecting unit 1007 and the transmitter 1010 described above may refer to a combination of analog and digital circuits, and/or one or more processors configured with software and/or firmware, e.g. stored in a memory, that when executed by one or more processors. One or more of these processors, as well as the other digital hardware, may be comprised in a single ASIC, or several processors and various digital hardware may be distributed among several separate components, whether individually packaged or assembled into a SoC.

The present mechanism for enabling a base station 301 to schedule the user equipment 305 in the wireless communication system 300 may be implemented through one or more processors, such as a processor 810 in the user equipment 305 depicted in FIG. 8 and a processor 1020 in the base station 301 depicted in FIG. 10, together with computer program code for performing the functions of the embodiments herein. The processor may be for example a Digital Signal Processor (DSP), ASIC processor, Field-programmable gate array (FPGA) processor or microprocessor. The program code mentioned above may also be provided as a computer program product, for instance in the form of a data carrier carrying computer program code for performing the embodiments herein when being loaded into the user equipment 305 and/or the base station 301. One such carrier may be in the form of a CD ROM disc. It is however feasible with other data carriers such as a memory stick. The computer program code may furthermore be provided as pure program code on a server and downloaded to the user equipment 305 and/or the base station 301.

Some example implementations of the embodiments illustrated above will now be described. Although the described solutions may be implemented in any appropriate type of telecommunication system supporting any suitable communication standards and using any suitable components, particular embodiments of the described solutions may be implemented in an HSDPA system, such as that illustrated in FIG. 3.

The example system may further comprise any additional elements suitable to support communication between the user equipment 305 or between the user equipment 305 and another communication device, such as a landline telephone. Although the illustrated wireless user equipment 305 may represent a communication device that comprises any suitable combination of hardware and/or software, this device may, in particular embodiments, represent a device such as the example user equipment 305 illustrated in greater detail by FIG. 12. Similarly, although the illustrated base station 301 may represent base stations that comprises any suitable combination of hardware and/or software, these nodes may, in particular embodiments, represent devices such as the example base station 301 illustrated in greater detail by FIG. 11.

Figure 11:
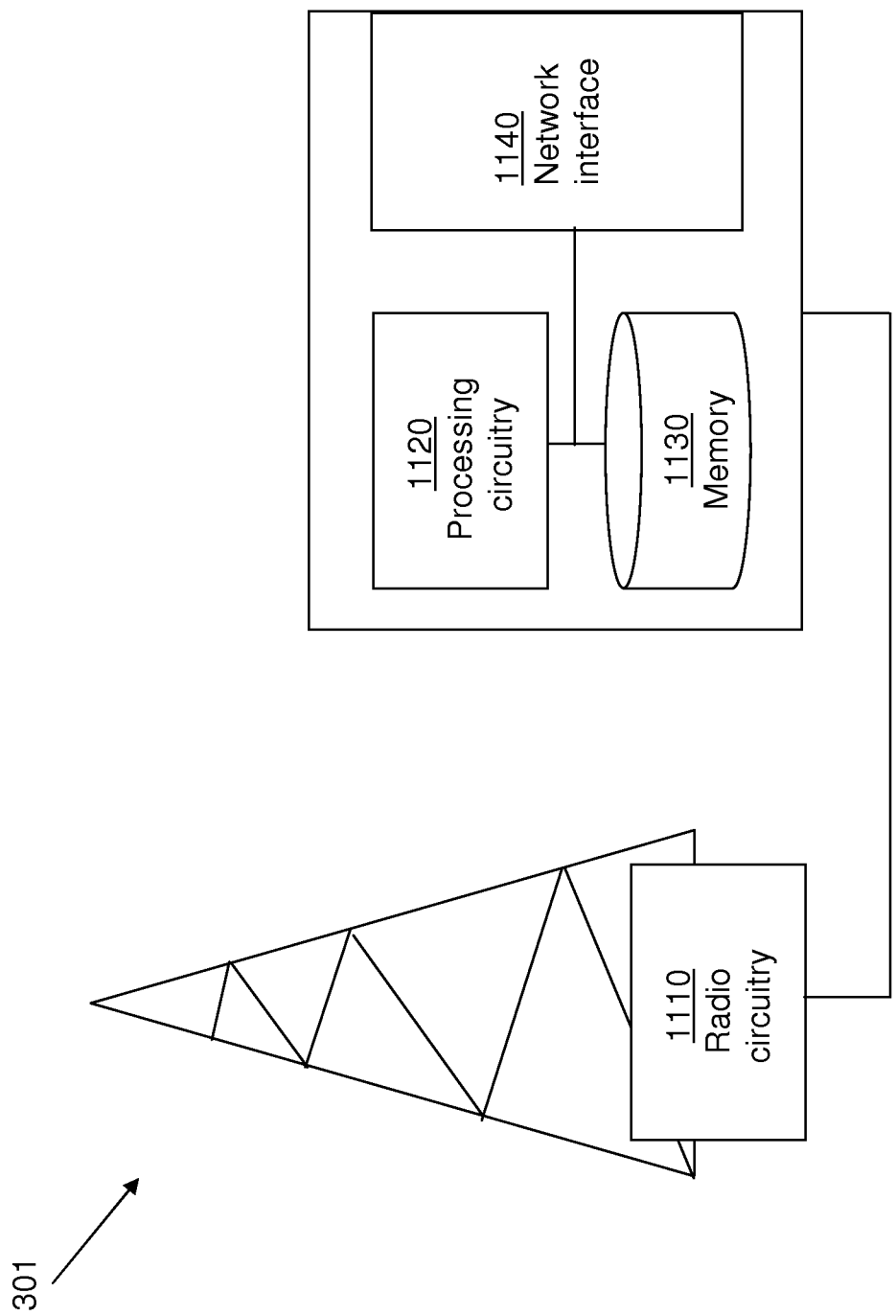
FIG. 11 is a schematic block diagram illustrating embodiments of a base station.

As shown in FIG. 11, the example base station 301 comprises processing circuitry 1120, a memory 1130, radio circuitry 1110, a network interface 1140 and at least one antenna. The processing circuitry 1120 may comprise Radio Frequency (RF) circuitry and baseband processing circuitry (not shown). In particular embodiments, some or all of the functionality described above as being provided by a mobile base station, a base station controller, a relay node, a NodeB, an enhanced NodeB, and/or any other type of mobile communications node may be provided by the processing circuitry 1120 executing instructions stored on a computer-readable medium, such as the memory 1130 shown in FIG. 11. Alternative embodiments of the base station 301 may comprise additional components responsible for providing additional functionality, comprising any of the functionality identified above and/or any functionality necessary to support the embodiments described above.

Figure 12:
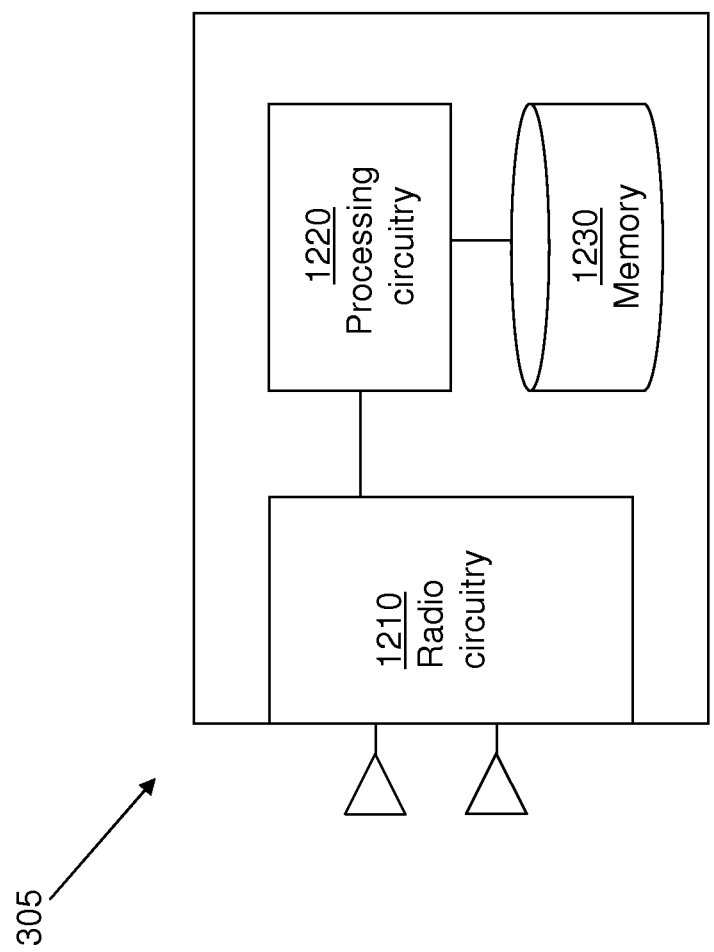
FIG. 12 is a schematic block diagram illustrating embodiments of a user equipment.

As shown in FIG. 12, the example user equipment 305 comprises processing circuitry 1220, a memory 1230, radio circuitry 1210, and at least one antenna. The radio circuitry 1210 may comprise RF circuitry and baseband processing circuitry (not shown). In particular embodiments, some or all of the functionality described above as being provided by mobile communication devices or other forms of devices may be provided by the processing circuitry 1220 executing instructions stored on a computer-readable medium, such as the memory 1230 shown in FIG. 12. Alternative embodiments of the user equipment 305 may comprise additional components beyond those shown in FIG. 12 that may be responsible for providing certain aspects of the user equipment's functionality, comprising any of the functionality described above and/or any functionality necessary to support the embodiments described above.

According to some embodiments, the feedback channel design options for four branch MIMO is based on the assumption of two codewords and two HARQ processes. Existing functionality may be re-used unless non-re-use may be justified by clear benefits. There are benefits of supporting four branch MIMO in combination with multicarrier operation. If the benefits are deemed sufficient, operation of four branch MIMO in combination with downlink multicarrier operation over one to four carriers may be enabled. It may be possible to operate four branch MIMO in combination with a single uplink carrier if applied with downlink multicarrier operation. One general goal may be to strive for a well-performing embodiment while at the same time trying to re-use existing techniques, e.g. multicarrier, when designing HS-DPCCH for 4×4 DL MIMO. One example is that it would be beneficial to re-use available codebooks if possible.

Summarized, some of the design options for the HS-DPCCH structure for four branch MIMO system with two HARQ processes were discussed above. The main objective of these design options is to reuse the existing HS-DPCCH structure. It is shown by simulations that the time multiplexed RI/PCI is a good design choice without any major change in the HARQ codebook design. In some embodiments the RI/PCI bits are time multiplexed in the existing 3GPP Release 10 HS-DPCCH structure. In some embodiments, two different structures for HS-DPCCH may be used, one is optimized for low rank transmissions and the other for higher rank transmissions.

The embodiments herein are not limited to the above described preferred embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The invention claimed is:

1. A method in a user equipment for enabling a base station to schedule the user equipment in a wireless communication system, which wireless communication system is in Multiple Input Multiple Output, MIMO, mode and comprises four transmit antennas, the user equipment being connected to the base station via a radio carrier, the method comprising:
    determining Channel State Information, CSI, based on information about a Common Pilot Indicator CHannel, CPICH, which CSI comprises Channel Quality Information, CQI, a Rank Indicator, RI, a Precoding Channel Indicator, PCI, and an Hybrid Automatic Repeat reQuest ACKnowledgement/Not ACKnowledgement, HARQ ACK/NACK; and
    transmitting the CSI to the base station over a plurality of Transmission Time Intervals, TTIs, enabling the base station to schedule the user equipment, and
    wherein the HARQ ACK/NACK and the CQI are transmitted in each TTI in the plurality of TTIs, and wherein the RI and the PCI are time multiplexed in a subplurality of the plurality of TTI.

2. The method according to claim 1, wherein the transmitting the CSI to the base station over a plurality of TTIs further comprises:
    transmitting the HARQ ACK/NACK, the CQI and the RI in a first TTI;
    transmitting the HARQ ACK/NACK, the CQI and the PCI in a second TTI; and
    transmitting the HARQ ACK/NACK, the CQI and the PCI in a third TTI, wherein the PCI transmitted in the second TTI indicates the Most Significant Bits, MSB, of the PCI and wherein the PCI transmitted in the third TTI indicates the Least Significant Bits, LSB, of the PCI.

3. The method according to claim 1, further comprising:
    receiving information about the scheduling from the base station using a High Speed-Shared Control CHannel, HS-SCCH; and
    receiving downlink data traffic from the base station using a High Speed-Physical Downlink Shared CHannel, HS-PDSCH.

4. The method according to claim 1, wherein the CSI is transmitted to the base station using a High Speed-Dedicated Physical Control CHannel, HS-DPCCH.

5. The method according to claim 1, wherein the radio carrier is a single downlink carrier or a multicarrier.

6. The method according to claim 1, wherein the wireless communication system is a High Speed Downlink Packet Access, HSDPA, system.

7. The method according to claim 1, wherein the TTI is a subframe.

8. A method in a user equipment for enabling a base station to schedule the user equipment in a wireless communication system, which wireless communication system is in Multiple Input Multiple Output, MIMO, mode and comprises four transmit antennas, the user equipment being connected to the base station via a radio carrier, the method comprising:
    determining Channel State Information, CSI, based on information about a Common Pilot Indicator CHannel, CPICH, which CSI comprises Channel Quality Information, CQI, a Rank Indicator, RI, a Precoding Channel Indicator, PCI, and an Hybrid Automatic Repeat reQuest ACKnowledgement/Not ACKnowledgement, HARQ ACK/NACK; and
    transmitting the CSI to the base station over a plurality of Transmission Time Intervals, TTIs, enabling the base station to schedule the user equipment, and
    wherein the HARQ ACK/NACK, the RI and the PCI are transmitted in each TTI in the plurality of TTIs, and wherein the CQI is time multiplexed in a subplurality of the plurality of TTIs.

9. A method in a user equipment for enabling a base station to schedule the user equipment in a wireless communication system, which wireless communication system is in Multiple Input Multiple Output, MIMO, mode and comprises four transmit antennas, the user equipment being connected to the base station via a radio carrier, the method comprising:
    determining Channel State Information, CSI, based on information about a Common Pilot Indicator CHannel, CPICH, which CSI comprises Channel Quality Information, CQI, a Rank Indicator, RI, a Precoding Channel Indicator, PCI, and an Hybrid Automatic Repeat reQuest ACKnowledgement/Not ACKnowledgement, HARQ ACK/NACK; and
    transmitting the CSI to the base station over a plurality of Transmission Time Intervals, TTIs, enabling the base station to schedule the user equipment, and
    wherein the HARQ ACK/NACK, the RI, the PCI and the CQI are transmitted in each TTI in the plurality of TTIs.

10. A method in a base station for scheduling a user equipment in a wireless communication system, which wireless communication system is in Multiple Input Multiple Output, MIMO, mode and comprises four transmit antennas, the base station being connected to the user equipment via a radio carrier, the method comprising:
    receiving Channel State Information, CSI, from the user equipment over a plurality of Transmission Time Intervals, TTIs, which CSI comprises Channel Quality Information, CQI, a Rank Indicator, RI, a Precoding Channel Indicator, PCI, and an Hybrid Automatic Repeat reQuest ACKnowledgement/Not ACKnowledgement, HARQ ACK/NACK; and
    scheduling the user equipment based on the received CSI, and
    wherein the HARQ ACK/NACK and the CQI are received in each TTI in the plurality of TTIs, and wherein the RI and the PCI are time multiplexed in a subplurality of the plurality of TTIs.

11. The method according to claim 10, further comprising receiving the HARQ ACK, the CQI and the RI in a first TTI; and
    selecting a random PCI based on the received RI;
    wherein the scheduling the user equipment based on the received CSI further comprises:
        scheduling the user equipment based on the received HARQ ACK/NACK, the CQI, the RI and the random PCI when the user equipment has received the RI; and
    wherein the method further comprises:

receiving the HARQ ACK/NACK, the CQI and the PCI in a second TTI; and receiving the HARQ ACK/NACK, the CQI and the PCI in a third TTI, wherein the PCI received in the second TTI indicates the Most Significant Bits, MSB of the PCI and wherein the PCI received in the third TTI indicates the Least Significant Bits, LSB of the PCI.

12. The method according to claim 10, wherein the scheduling the user equipment based on the received CSI further comprises:

scheduling a transport block, a modulation and coding scheme and a precoding control index to the user equipment.

13. The method according to claim 10, further comprising:

transmitting information about the scheduling to the user equipment using a High Speed-Shared Control CHannel, HS-SCCH; and transmitting downlink data traffic to the user equipment using a High Speed-Physical Downlink Shared CHannel, HS-PDSCH.

14. The method according to claim 10, wherein the CSI is received from the user equipment using a High Speed-Dedicated Physical Control CHannel, HS-DPCCH.

15. The method according to claim 10, wherein the radio carrier is a single downlink carrier or a multicarrier.

16. The method according to claim 10, wherein the wireless communication system is a High Speed Downlink Packet Access, HSDPA, system.

17. The method according to claim 10, wherein the TTI is a subframe.

18. A method in a base station for scheduling a user equipment in a wireless communication system, which wireless communication system is in Multiple Input Multiple Output, MIMO, mode and comprises four transmit antennas, the base station being connected to the user equipment via a radio carrier, the method comprising:

receiving Channel State Information, CSI, from the user equipment over a plurality of Transmission Time Intervals, TTIs, which CSI comprises Channel Quality Information, CQI, a Rank Indicator, RI, a Precoding Channel Indicator, PCI, and an Hybrid Automatic Repeat reQuest ACKnowledgement/Not ACKnowledgement, HARQ ACK/NACK; and scheduling the user equipment based on the received CSI, and wherein the HARQ ACK/NACK, the RI and the PCI are received in each TTI in the plurality of TTIs, and wherein the CQI is time multiplexed in a subplurality of the plurality of TTIs.

19. A method in a base station for scheduling a user equipment in a wireless communication system, which wireless communication system is in Multiple Input Multiple Output, MIMO, mode and comprises four transmit antennas, the base station being connected to the user equipment via a radio carrier, the method comprising:

receiving Channel State Information, CSI, from the user equipment over a plurality of Transmission Time Intervals, TTIs, which CSI comprises Channel Quality Information, CQI, a Rank Indicator, RI, a Precoding Channel Indicator, PCI, and an Hybrid Automatic Repeat reQuest ACKnowledgement/Not ACKnowledgement, HARQ ACK/NACK; and scheduling the user equipment based on the received CSI, and wherein the HARQ ACK/NACK, the RI, the PCI and the CQI are received in each TTI in the plurality of TTIs.

20. A user equipment for enabling a base station to schedule the user equipment in a wireless communication system, which wireless communication system is in Multiple Input Multiple Output, MIMO, mode and comprises four transmit antennas, the user equipment being connected to the base station via a radio carrier, the user equipment comprises:

a processor configured to determine a Channel State Information, CSI, based on information about a Common Pilot Indicator CHannel, CPICH, which CSI comprises Channel Quality Information, CQI, a Rank Indicator, RI, a Precoding Channel Indicator, PCI, and an Hybrid Automatic Repeat reQuest ACKnowledgement/Not ACKnowledgement, HARQ ACK/NACK; and a transmitter configured to transmit the CSI to the base station over a plurality of Transmission Time Intervals, TTIs, enabling the base station to schedule the user equipment, and wherein the HARQ ACK/NACK and the CQI are transmitted in each TTI in the plurality of TTIs, and wherein the RI and the PCI are time multiplexed in a subplurality of the plurality of TTIs.

21. The user equipment according to claim 20, wherein the transmitter is further configured to:

transmit the HARQ ACK/NACK, the CQI and the RI in a first TTI;

transmit the HARQ ACK/NACK, the CQI and the PCI in a second TTI; and to transmit the HARQ ACK/NACK, the CQI and the PCI in a third TTI, wherein the PCI transmitted in the second TTI indicates the Most Significant Bits, MSB, of the PCI and wherein the PCI transmitted in the third TTI indicates the Least Significant Bits, LSB, of the PCI.

22. The user equipment according to claim 20, further comprising:

a receiver configured to:

receive information about the scheduling from the base station using a High Speed-Shared Control CHannel, HS-SCCH; and to receive downlink data traffic from the base station using a High Speed-Physical Downlink Shared CHannel, HS-PDSCH.

23. The user equipment according to claim 20, wherein the CSI is transmitted to the base station using a High Speed-Dedicated Physical Control CHannel, HS-DPCCH.

24. The user equipment according to claim 20, wherein the radio carrier is a single downlink carrier or a multicarrier.

25. The user equipment according to claim 20, wherein the wireless communication system is a High Speed Downlink Packet Access, HSDPA, system.

26. The user equipment according to claim 20, wherein the TTI is a subframe.

27. A user equipment for enabling a base station to schedule the user equipment in a wireless communication system, which wireless communication system is in Multiple Input Multiple Output, MIMO, mode and comprises four transmit antennas, the user equipment being connected to the base station via a radio carrier, the user equipment comprises:

a processor configured to determine a Channel State Information, CSI, based on information about a Common Pilot Indicator CHannel, CPICH, which CSI comprises Channel Quality Information, CQI, a Rank Indicator, RI, a Precoding Channel Indicator, PCI, and an Hybrid Automatic Repeat reQuest ACKnowledgement/Not ACKnowledgement, HARQ ACK/NACK; and a transmitter configured to transmit the CSI to the base station over a plurality of Transmission Time Intervals, TTIs, enabling the base station to schedule the user equipment, and wherein the HARQ ACK/NACK, the RI and the PCI are transmitted in each TTI in the plurality of TTIs, and wherein the CQI is time multiplexed in a subplurality of the plurality of TTIs.

28. A user equipment for enabling a base station to schedule the user equipment in a wireless communication system, which wireless communication system is in Multiple Input Multiple Output, MIMO, mode and comprises four transmit antennas, the user equipment being connected to the base station via a radio carrier, the user equipment comprises:
a processor configured to determine a Channel State Information, CSI, based on information about a Common Pilot Indicator CHannel, CPICH, which CSI comprises Channel Quality Information, CQI, a Rank Indicator, RI, a Precoding Channel Indicator, PCI, and an Hybrid Automatic Repeat reQuest ACKnowledgement/Not ACKnowledgement, HARQ ACK/NACK; and
a transmitter configured to transmit the CSI to the base station over a plurality of Transmission Time Intervals, TTIs, enabling the base station to schedule the user equipment, and
wherein the HARQ ACK/NACK, the RI, the PCI and the CQI are transmitted in each TTI in the plurality of TTIs.

29. A base station for scheduling a user equipment in a wireless communication system, which wireless communication system is in Multiple Input Multiple Output, MIMO, mode and comprises four transmit antennas, the base station being connected to the user equipment via a radio carrier, the base station comprises:
a receiver configured to receive Channel State Information, CSI, from the user equipment over a plurality of Transmission Time Intervals, TTIs, which CSI comprises Channel Quality Information, CQI, a Rank Indicator, RI, a Precoding Channel Indicator, PCI, and an Hybrid Automatic Repeat reQuest ACKnowledgement/Not ACKnowledgement, HARQ ACK/NACK; and
a scheduler configured to schedule the user equipment based on the received CSI, and
wherein the HARQ ACK/NACK and the CQI are received in each TTI in the plurality of TTIs, and wherein the RI and the PCI are time multiplexed in a subplurality of the plurality of TTIs.

30. The base station according to claim 29, wherein the receiver is further configured to receive the HARQ ACK/NACK, the CQI and the RI in a first TTI;
wherein the base station further comprises:
a processor configured to select a random PCI based on the received RI;
wherein the scheduler is further configured to:
schedule the user equipment based on the received HARQ ACK/NACK, the CQI, the RI and the random PCI when the user equipment has received the RI; and
wherein the receiver is further configured to:
receive the HARQ ACK/NACK, the CQI and the PCI in a second TTI; and to
receive the HARQ ACK/NACK, the CQI and the PCI in a third TTI, wherein the PCI received in the second TTI indicates the Most Significant Bits, MSB, of the PCI and wherein the PCI received in the third TTI indicates the Least Significant Bits, LSB, of the PCI.

31. The base station according to claim 29, wherein the scheduler is further configured to schedule a transport block, a modulation and coding scheme and a precoding control index to the user equipment.

32. The base station according to claim 29, further comprises:
a transmitter configured to:
transmit information about the scheduling to the user equipment using a High Speed-Shared Control CHannel, HS-SCCH; and to
transmit downlink data traffic to the user equipment using a High SpeedPhysical Downlink Shared CHannel, HS-PDSCH.

33. The base station according to claim 29, wherein the CSI is received from the user equipment using a High Speed-Dedicated Physical Control CHannel, HS-DPCCH.

34. The base station according to claim 29, wherein the radio carrier is a single downlink carrier or a multicarrier.

35. The base station according to claim 29, wherein the communication system is a High Speed Downlink Packet Access, HSDPA, system.

36. The base station according to claim 29, wherein the TTI is a subframe.

37. A base station for scheduling a user equipment in a wireless communication system, which wireless communication system is in Multiple Input Multiple Output, MIMO, mode and comprises four transmit antennas, the base station being connected to the user equipment via a radio carrier, the base station comprises:
a receiver configured to receive Channel State Information, CSI, from the user equipment over a plurality of Transmission Time Intervals, TTIs, which CSI comprises Channel Quality Information, CQI, a Rank Indicator, RI, a Precoding Channel Indicator, PCI, and an Hybrid Automatic Repeat reQuest ACKnowledgement/Not ACKnowledgement, HARQ ACK/NACK; and
a scheduler configured to schedule the user equipment based on the received CSI, and
wherein the HARQ ACK/NACK, the RI and the PCI are received in each TTI in the plurality of TTIs, and wherein the CQI is time multiplexed in a subplurality of the plurality of TTIs.

* * * * *